(12) United States Patent
Jenkins et al.

(10) Patent No.: US 9,231,949 B1
(45) Date of Patent: Jan. 5, 2016

(54) CONTENT DELIVERY TO USER DEVICES USING SERVER-INITIATED CONNECTIONS

(75) Inventors: Jonathan A. Jenkins, Seattle, WA (US);
Peter F. Hill, Seattle, WA (US); Brett R. Taylor, Bainbridge Island, WA (US)

(73) Assignee: Amazon Technologies, Inc., Seattle, WA (US)

( * ) Notice: Subject to any disclaimer, the term of this patent is extended or adjusted under 35 U.S.C. 154(b) by 212 days.

(21) Appl. No.: 13/572,550

(22) Filed: Aug. 10, 2012

(51) Int. Cl.
*G06F 15/16* (2006.01)
*H04L 29/06* (2006.01)

(52) U.S. Cl.
CPC .................................. *H04L 63/10* (2013.01)

(58) Field of Classification Search
CPC ..... H04L 29/06; H04L 63/0823; H04L 67/42;
H04L 67/32; H04L 63/0807; H04L 65/4084;
H04L 29/0809; H04L 69/16; H04L 67/125;
H04L 63/10
USPC .......................... 726/4, 21; 709/227, 203, 230
See application file for complete search history.

(56) References Cited

U.S. PATENT DOCUMENTS

| 5,951,694 | A  | * | 9/1999  | Choquier et al. ............... 714/15 |
|-----------|----|---|---------|---------------------------------------|
| 6,226,750 | B1 | * | 5/2001  | Trieger .............................. 726/3 |
| 6,606,645 | B1 | * | 8/2003  | Cohen et al. ................... 709/203 |
| 6,981,278 | B1 | * | 12/2005 | Minnig ............. H04L 29/12367 709/245 |
| 7,010,578 | B1 | * | 3/2006  | Lewin ............... G06F 17/30905 707/E17.121 |
| 7,248,861 | B2 | * | 7/2007  | Lazaridis ............... G06Q 30/00 455/412.1 |
| 8,095,679 | B1 | * | 1/2012  | Satish ................ G06F 9/44521 709/213 |
| 2003/0182576 | A1 | * | 9/2003 | Morlang ............. H04L 63/0428 713/171 |
| 2003/0188193 | A1 | * | 10/2003 | Venkataramappa ........................... H04L 63/0815 726/10 |
| 2005/0108517 | A1 | * | 5/2005 | Dillon et al. ................... 713/150 |
| 2010/0058064 | A1 | * | 3/2010 | Kirovski et al. .............. 713/176 |
| 2010/0218248 | A1 | * | 8/2010 | Nice ................... H04L 63/0272 726/12 |
| 2011/0029670 | A1 | * | 2/2011 | Klein ...................... H04W 4/02 709/225 |
| 2012/0144019 | A1 | * | 6/2012 | Zhu ...................... H04L 67/141 709/224 |
| 2012/0317243 | A1 | * | 12/2012 | Gao ....................... H04H 20/95 709/219 |
| 2013/0145151 | A1 | * | 6/2013 | Brown et al. ................. 713/156 |

OTHER PUBLICATIONS

Barford et al., Generating Representative Web Workloads for Network and Server Performance Evaluation, 1998, pp. 151-160.*

* cited by examiner

*Primary Examiner* — Farid Homayounmehr
*Assistant Examiner* — Lizbeth Torres-Diaz
(74) *Attorney, Agent, or Firm* — Knobbe, Martens, Olson & Bear, LLP

(57) ABSTRACT

Features are disclosed for enabling servers to initiate the opening of connections with clients, initiate transfers of data to clients, and provide clients with hints regarding which content retrieval, connection establishment, and other network operations will likely improve user-perceived performance on the client. A token may be transmitted from a client to a server, and the server may utilize the token to initiate a network connection with the client and send data to the client. The token may also be passed to a third party for similar use. Hints may be provided to the client, indicating actions that the client may perform in order to improve content processing efficiency and enhance a user experience with the content. The disclosed features may, for example, be incorporated into web browser and server software.

28 Claims, 8 Drawing Sheets

CONTENT DELIVERY TO USER DEVICES USING SERVER-INITIATED CONNECTIONS

BACKGROUND

In a network communication environment, such as the Internet, a client computing device (client) may utilize a software browser application to initiate network connections with server computing devices (servers), and subsequently request content from those servers. Servers may respond to client requests for content, but in typical Hypertext Transfer Protocol (HTTP) based communications, servers do not initiate transfers of content to clients. A request from the client is typically required in order to initiate any transfer of data from the server to the client. Other protocols, such as SPDY, enable a server to initiate a data transfer to a client over a connection initiated by the client device.

Servers may provide indications to clients regarding which network resources to retrieve to improve the performance of future content requests and processing. Such predicted or anticipatory retrieval, also known as prefetching, may be implemented through use of a prefetch hint embedded within a Hypertext Markup Language (HTML) file. In a typical implementation, servers can determine which content a client is likely to request next, and include a prefetch hint identifying which linked content to proactively fetch. Clients receiving an HTML file with a prefetch hint may request the indicated content before it is requested by a user.

BRIEF DESCRIPTION OF DRAWINGS

Throughout the drawings, reference numbers may be re-used to indicate correspondence between referenced elements. The drawings are provided to illustrate example embodiments described herein and are not intended to limit the scope of the disclosure.

DETAILED DESCRIPTION

Introduction

Figure 1:
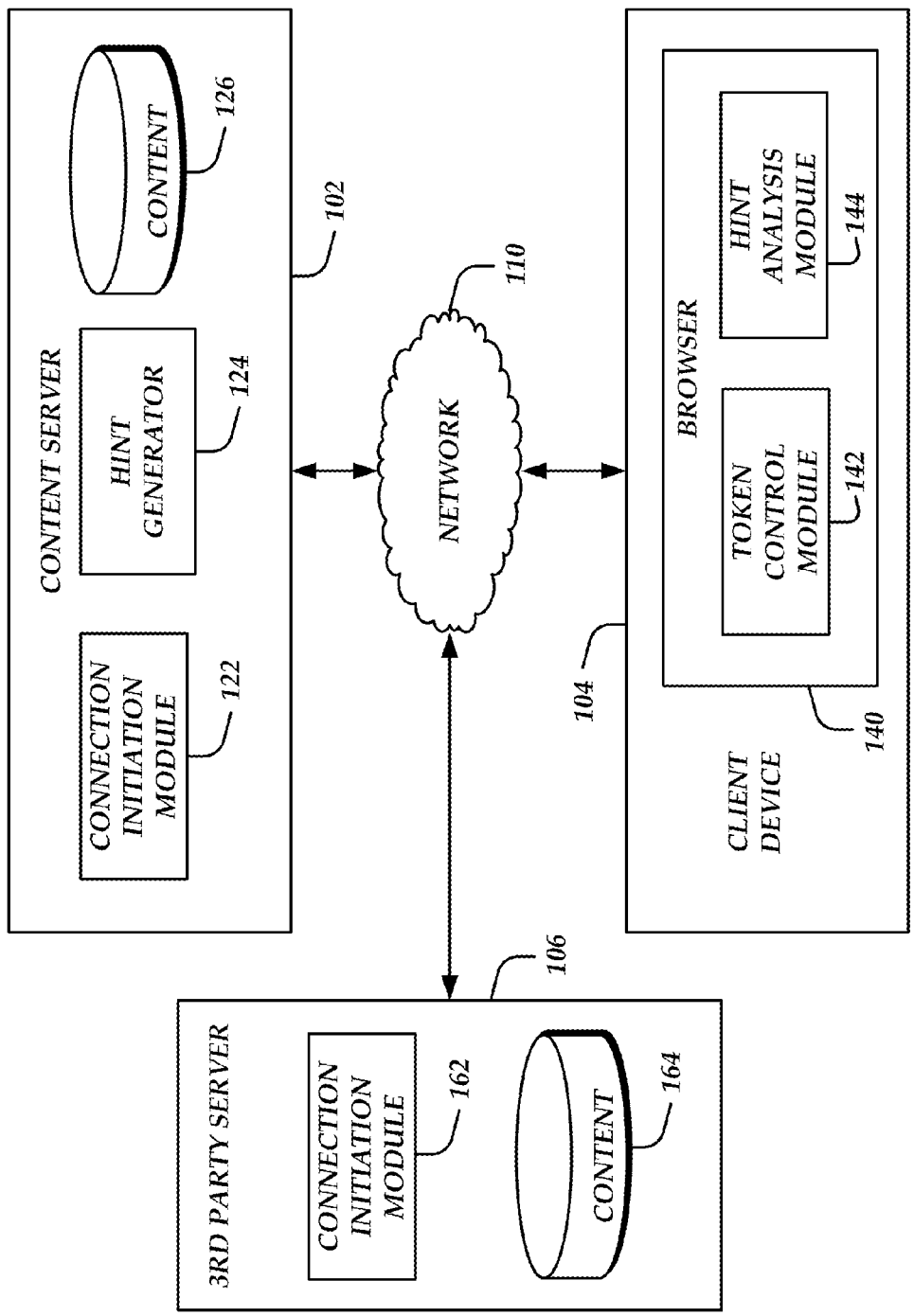
FIG. 1 is a block diagram of an illustrative content delivery environment including a client device, a content server, and a third party server.

The present disclosure is directed to, among other features, enabling servers to initiate the opening of connections with clients and to initiate the transfer of data to clients. Also disclosed are features for enabling a server to provide clients with hints regarding which content retrieval, connection establishment, and other network operations will likely improve perceived performance on the client. The various features may, for example, be used to improve user-perceived performance in environments in which content is requested and transferred using the HTTP protocol.

Some embodiments involve the transmission of a token from a client to a server. The server may subsequently utilize the token to initiate additional network connections with the client, passing the token (or data derived from it) back to the client to authenticate the server to the client. A client, upon receipt of a request to establish a connection, can verify that the token is valid prior to establishing the requested connection. Once a connection is established, a server may transmit content or other data to the client without requiring a request first. Additional aspects of the disclosure relate to use of the token by third party servers, received from a server to which a client originally transmitted the token, to establish connections with the client device in a similar manner.

Further aspects of the disclosure relate to providing hints to a client which the client may use to improve user-perceived performance with respect to a current or future request. The hints may indicate a number of connections to be established, which entities to establish the connections with, and/or which content to retrieve. A client may utilize the hints to retrieve content prior to determining that the content is needed or desired. For example, a hint file may be provided that lists which resources to retrieve and in which order to retrieve them. The hints may be determined dynamically by the server, in some cases in response to feedback or initial indications received from a client. The feedback or initial indications may relate to network characteristics such as bandwidth, screen display size or resolution, etc.

Although aspects of the embodiments described in this disclosure will focus, for the purpose of illustration, on relationships and interactions between client devices and content servers, one skilled in the art will appreciate that the techniques disclosed herein may be applied to any number of hardware or software processes or applications. Further, although various aspects of the disclosure will be described with regard to illustrative examples and embodiments, one skilled in the art will appreciate that the disclosed embodiments and examples should not be construed as limiting. Various aspects of the disclosure will now be described with regard to certain examples and embodiments, which are intended to illustrate but not limit the disclosure.

With reference to an illustrative embodiment, a user of a client device may launch a web browser application and submit a request to a server. The request may be for a web page or some other network-accessible resource. The web browser may transmit the request according to a standard protocol, such as Hypertext Transfer Protocol (HTTP). The web browser may also include a token, such as an encrypted identifier of the client device, in the HTTP request. The token may be transmitted to the server in order to authenticate future communication from the server. For example, if a server were to attempt to open a connection with a client device, the client device may ignore such a request according to standard security practices. However, if the server were to include the token that the client itself transmitted to the server, then the client may determine based on the token and other information about the server (e.g. IP address) that the server is known, that opening the connection may be desirable, and further that opening a connection with the server is safe.

In some cases, the server may utilize the connection to transmit content and data that the server knows or predicts the client will need, but which the client does not yet know it needs or has not yet requested it. For example, the server may be a web server configured to host content pages and transmit the content pages and resources embedded within the content pages in response to requests from client devices. If a client device requests a web page, the server hosting the page can determine that the client will need the embedded resources in order to fully render the web page, even though the client has not yet received a Hypertext Markup Language (HTML) file corresponding to the requested page that indicates which embedded objects to retrieve next. By establishing a second connection with the client, the server may begin to transmit the embedded resources to the client in parallel with the HTML file, in a prioritized sequence, etc.

Some embedded resources may not be hosted by the server. For example, the web pages hosted by the server may reference several objects which are hosted by a third-party server, such as a content delivery network (CDN) server. In such cases, the server may transmit a copy of the token to the CDN server or other third-party server. The third-party server may then utilize the token to request establishment of a connection with the client device. The client device may process the token to determine that it is authentic (e.g., decrypt the token to obtain an identifier, and verify that the client generated the identifier and therefore the token). If the token is authentic and the client device is configured to accept connections from third party servers, the client may accept the request, establish the connection, and begin to receive files via the newly established connection at the initiation of the third-party server.

The client device may already have content present that the server or third party server attempts to transmit. For example, browser applications commonly have local caches, and content previously requested and received by the client device may be present in the cache. Transmission of redundant content may impact network performance and reduce, eliminate, or even counteract any benefit otherwise realized by allowing servers to establish connections and proactively transmit content. Accordingly, the server may submit a request to the client device to determine whether a specific content item is present in a local cache and, if so, to determine the last edit date associated with the content item. The server may analyze the response and, if it determines that the version cached on the client is current, then the server may proceed with attempting to transmit other content items according to a similar process.

A server may also transmit hints or other instructions to a client device. Using the procedure described above and elsewhere herein, the server may establish a connection with the client device. Rather than directly transmit content to the client device to enhance performance of a given content page, the server may instead transmit a file or stream of data to the client that the client may use to request various content files and other objects. In a typical environment, the client may request the HTML file corresponding to a desired web page. The HTML file includes embedded references to other resources, and as the browser application of the client device processes the HTML file and encounters an embedded reference, the browser application requests the corresponding resource. The server may determine an effective prioritization for retrieval of resources associated with the content page hosted by the server, and transmit a hint file to the client device when the client device requests an HTML file. The hint file may indicate which embedded resources the client device will request in order to fully retrieve the web page, which servers (e.g.: third party servers) the embedded resources are to be retrieved from, in what order to retrieve the resources, etc. Accordingly, the client device may analyze the hint file and begin to retrieve resources necessary or desirable for complete display of a web page before the client device fully receives and process the HTML file which references the resources.

The hint file may also be used to customize a response for a given client. For example, a client device may be associated with a network that has certain characteristics (e.g.: bandwidth, latency), a display with certain characteristics (e.g.: size, resolution). The client may disclose information regarding these characteristics to the server, or the server may detect them. The server may transmit a hint file indicating that specific versions of resources are to be retrieved or specific host servers are to be contacted in order to retrieve content associated with the page that may be targeted specifically for the characteristics of a user device. For example, the client device may be a mobile phone with a small display and limited network bandwidth. The server may, through the use of a hint file, inform the mobile phone of low resolution images to retrieve for display instead of the high quality images typically displayed on a page hosted by the server.

Network Computing Environment

Turning now to FIG. 1, an illustrative network computing environment in which the features described above may be implemented will be described. The network computing environment 100 may include a content server 102, a client device 104, and a third party server 106. The various systems may communicate with each other via a communication network 110. The network 110 may be a publicly accessible network of linked networks, possibly operated by various distinct parties, such as the Internet. In other embodiments, the network 110 may include a private network, personal area network, local area network, wide area network, cable network, satellite network, cellular telephone network, etc. or combination thereof, each with access to and/or from the Internet.

The content server 102 can correspond to a logical association of one or more computing devices for hosting content and servicing requests for the hosted content over the network 110. For example, the content server 102 may include a web server, an application server, a proxy server, or some other device or group of devices that provide content to requesting client devices 104. Illustratively, the content server 102 of FIG. 1 includes a number of components to implement server-initiated connections and hint file generation, such as a connection establishment component 122, a hint generator 124, and a content data store 126.

A connection establishment component 122 may be configured to establish connections with client devices 104. The connection establishment component 122 may be implemented as a hardware component of the content server or as a combination of hardware and software executing on the hardware. A hint generator 124 may be configured to generate hint files and streams in response to content requests and other communications to or from client devices 104. The hint generator 124 may be implemented as a hardware component of the content server or as a combination of hardware and software executing on the hardware, similar to the connection establishment component 122. A content data store 126 may be configured to store records, files, and other objects corresponding to content hosted by the content server 102. The content data store 126 may correspond to a file system, a relational database, or some other electronic data store. In some embodiments, the content server 102 may include additional or fewer components than illustrated in FIG. 1. For example, the content server may not include a hint generator 124, or may include, or it may include or otherwise be associated with various additional computing resources, such as content delivery network (CDN) systems, domain name system (DSN) servers, and the like.

The client device 104 may correspond to a wide variety of computing devices, including personal computing devices, laptop computing devices, hand held computing devices, terminal computing devices, mobile devices (e.g., mobile phones, tablet computing devices, etc.), wireless devices, electronic readers, media players, and various other electronic devices and appliances. A client device 104 may be configured with a browser application 140 to communicate via the network 110 with other computing systems, such the content server 102 or third party server 106, and to request, receive, process, and display content. The browser 140 may include a token control module 142 and a hint analysis module 144. The token control module 142 may be configured to generate and transmit tokens to the content server 102, and to authenticate tokens received from the content server 102, third party server 106, or some other device in response to a request to establish a connection. The hint analysis module 144 may be configured to receive and analyze hint files and other hint data from a content server 102, and to initiate various actions based on the hints.

The third party server 106 can correspond to a logical association of one or more computing devices for hosting content and servicing requests for the hosted content over the network 110. For example, the third party server 106 can include a web server component corresponding to one or more server computing devices for obtaining and processing requests for content (such as content pages) from the client device 104. In some embodiments, one or more content providers 106 may be associated with a CDN service provider, an application service provider, etc. The third party server 106 may include a connection establishment component 162 and a content data store 166, similar to the content server 102.

Server Initiated Connections

Figure 2:
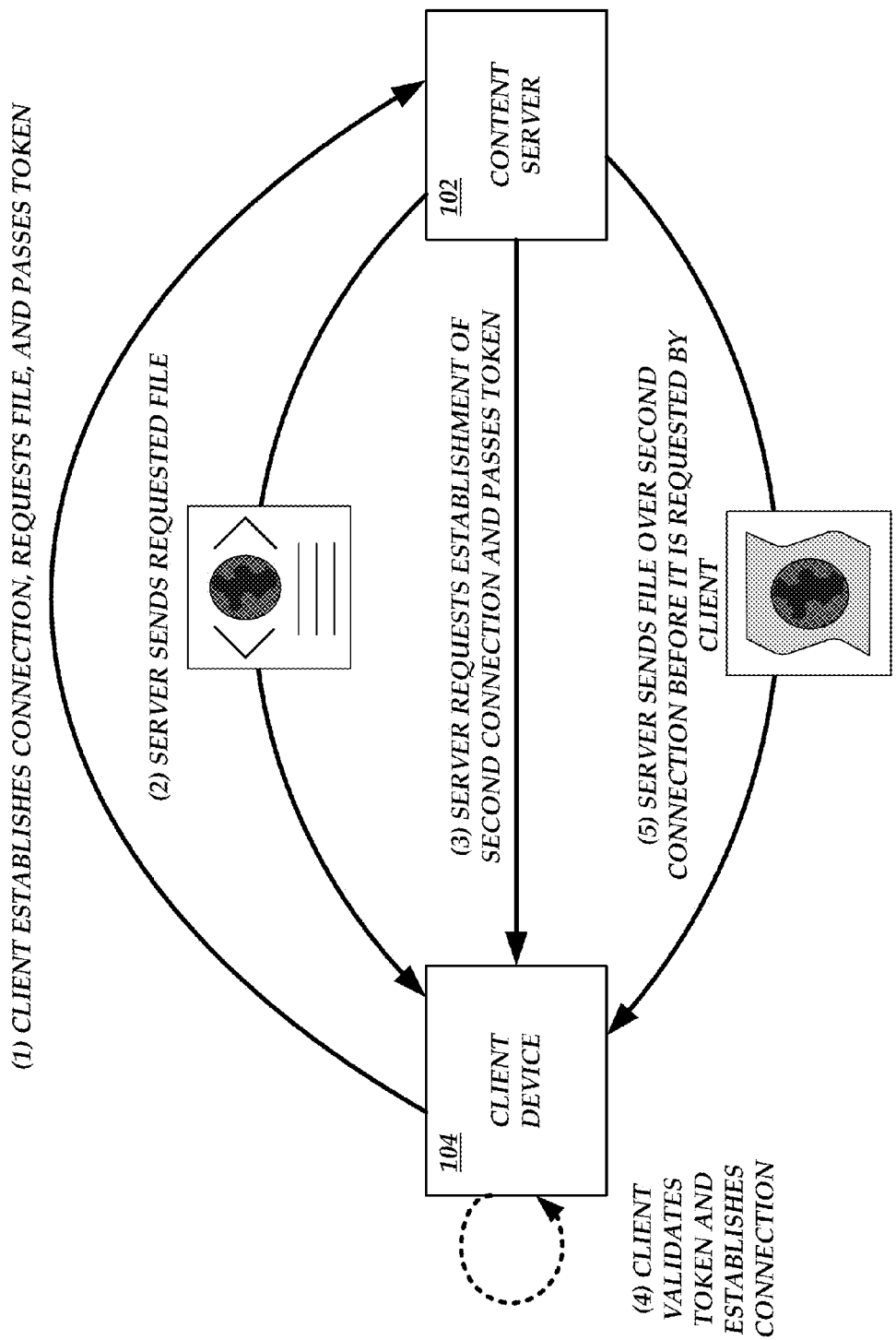
FIG. 2 is a block diagram of illustrative communications and data flows between a client device and a content server.

FIGS. 2-5 illustrate data flows and processes for implementing various features related to server-initiated connections and the use of tokens. With reference to FIG. 2, a client device 104 may establish a connection at (1) to a content server 102. The connection may be a Transmission Control Protocol/Internet Protocol (TCP/IP) connection, as is commonly used in network computing environments such as the internet. The client device 104 may communicate with the content server 102 by sending an HTTP request, or by utilizing some other communication protocol, such as SPDY, to send a request. For example, the client device may 104 transmit an HTTP GET request. In order to facilitate authentication of the content server 102 in the future, such as when the content server 102 attempts to establish a connection with the client device 104, the token control module 142 may be used to generate a token for transmission to the content server 102. A token generated by the token control module 142 may be transmitted in an HTTP header or as part of a separate transmission.

An HTTP GET request typically includes data regarding the identity of the host, which corresponds to the content server 102 in this case, the identity of the requested file, which may correspond to the landing page of a web site, and information about the client device 104. The information about the client device 104 can include the User-Agent HTTP header, which specifies, among other things, the name and version of the browser that the client device 104 is using to make the request. In some embodiments, a custom HTTP header may be included with the request, such as a Connection-Token HTTP header. The custom header may be added to some or all requests generated by the client device 104. Because the header is a custom header, a content server 102 may not be able to identify the token and use it if the content server 102 is not specifically configured to do so. Content servers 102 that do not support the custom header may ignore it. In some embodiments, the token control module 142 may utilize an existing HTTP header to transmit the token. Further embodiments may not involve use of any HTTP header, and may utilize different protocols such as SPDY.

In response to receiving a request, such as the illustrative HTTP GET request described above, a content server 102 may respond with the requested file at (2). If the content server 102 is configured to receive the custom HTTP header that contains the token, the content server 102 may initiate a process for determining whether establishing a second connection with the client device 104 is desirable. For example, the content server 102 may determine that opening an additional connection to the client device 104 and sending files over the new connection will improve the performance and user experience on the client device 104. Accordingly, the content server 102 may pass the token, or data derived from the token (e.g.: data generated by a challenge-response algorithm), back to the client device 104 and request that a new connection be opened at (3). The sequence of events may, in some embodiments, be reversed. For example, a content server 102 may request establishment of a new connection prior to responding with the originally requested content. In further embodiments, the response to the client device 104 request and the request to the client device 104 to open a connection may be performed substantially in parallel.

The client device 104 can analyze the token at (4) and determine whether the token is valid. For example, the client device 104 may create tokens from randomly generated data, content server 102 identification data, client device 104 identification data, or any other data to which the client device 104 has access. In some cases, the token may be created with a time stamp to implement expiration. The data may be encrypted such that a content server 102 or some third party does not have access to the data contained therein and cannot tamper with the token or generate fraudulent tokens. The client device 104 may also record which tokens have been created. Upon receipt of a token, the client device 104 can determine whether the token is valid by decrypting the data, checking the record of which tokens have been created, and other operations depending on the method originally used to generate the token. In some embodiments, the content server 102 may modify the token according to some previously determined or approved method prior to passing it back. For example, the content server 102 may digitally sign the token with a private key and transmit the digitally signed token and the original token back to the client device 104 for authentication. Such modifications to the token may be used to verify the identity of the content server 102 or otherwise enhance the trust that a client device 104 has in the validity of the token.

If the client device 104 determines that the token is valid, the client device 104 may accept or otherwise establish the connection with the content server 102. Thereafter, the content server 102 may use the newly opened connection at (5) to transmit files or other data to the client device 104 at the content server's 102 initiative (e.g.: without receiving a request for a file or data).

Figure 3:
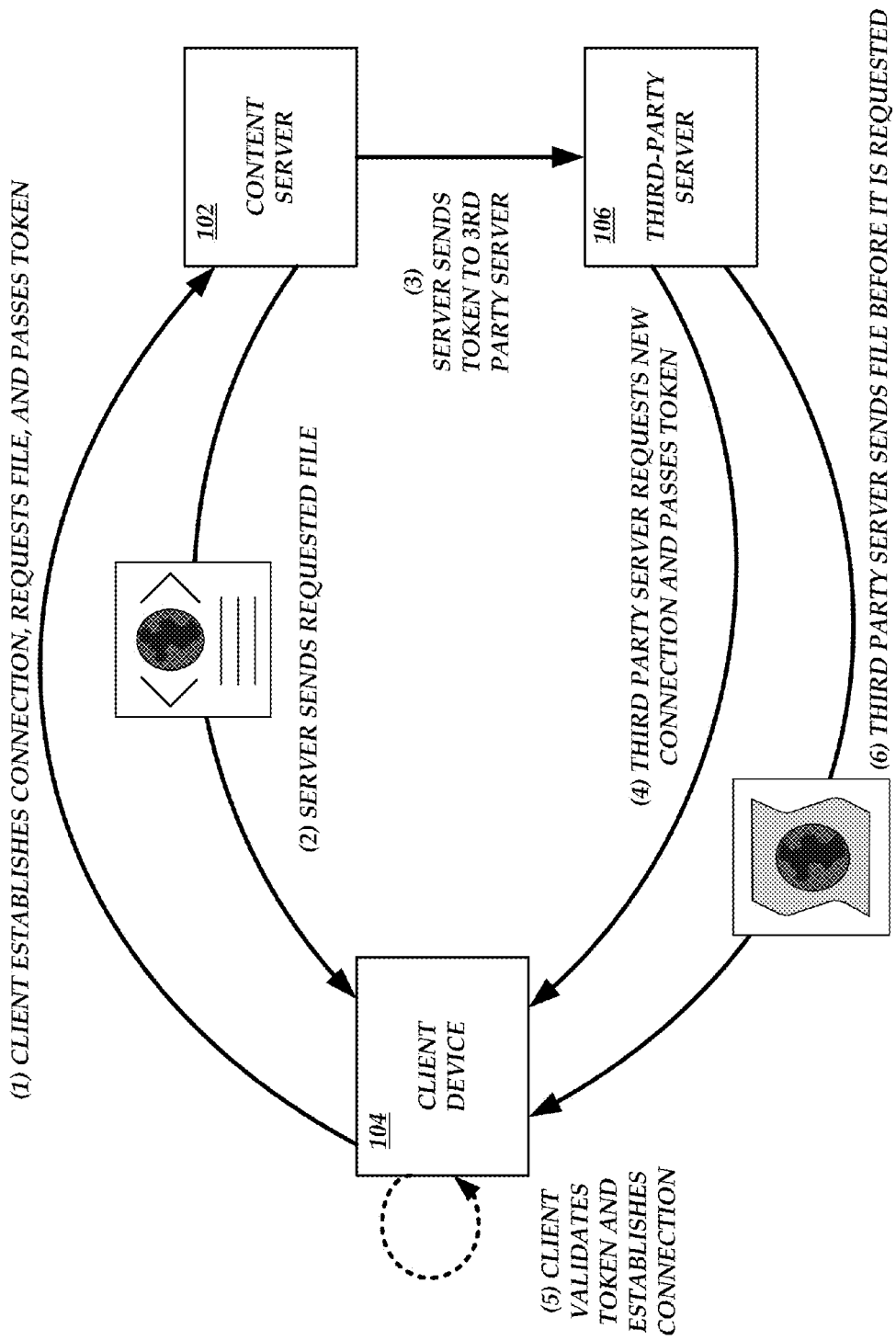
FIG. 3 is a block diagram of illustrative communications and data flows between a client device, a content server, and a third party server.

Turning now to FIG. 3, illustrative interactions and data flows to allow a third party server 106 to establish a connection with the client device 104 will be described. The client device 104 may establish a connection, request a file, or transmit some other communication, and also pass a token to a content server 102 at (1), similar to the request described above with respect to FIG. 2. The content server 102 may respond at (2) by transmitted the requested file to the client device 104.

The content server 102 may, instead of or in addition to requesting a new connection with the client device 104, transmit the token or some data derived from or otherwise based on the token to a third party server 106 at (3). For example, if the content server 102 determines that certain files are going to be needed in order for a client device 104 to fully receive a web page, and that one or more of those files are hosted by a third party server 106, the content server 102 may send the token to the third party server 106. In some embodiments, the content server 102 may send additional data to the third party server 106, such as the IP address of the client device 104, and the name of a file that should be sent to the client device 104. The third party server 106 may then contact the client device 104 using the supplied IP address or some other method of identifying or addressing the client device 104, and request that a connection be opened at (4). The third party server 106 may transmit the token received from the content server 102, or some data derived from or otherwise based on the token, to the client device 104.

The client device 104 may validate the token at (5), as described above with respect to FIG. 3. In some embodiments, additional validation may be performed due to the third party nature of the third party server 106. For security reasons, the client device 104 may have a list of third parties that it will accept connections from, and may deny connection requests from all other third parties even if they present an otherwise valid token. The client device 104 may also contact the original recipient of the token—content server 102 in this example—in order to verify that the token was intended to be passed to a third party server 106.

Upon validating the token, the client device 104 may open the connection with the third party server 106. The third party server 106 may then use the newly opened connection to transmit files or other data to the client device 104 at (6) at the initiative of the third party server 106, similar to the transmission from a content server 102 to the client device 104 described above with respect to FIG. 2. A file may be transmitted to the client device 104 prior to receiving a request from the client device 104 for the file.

Figure 4:
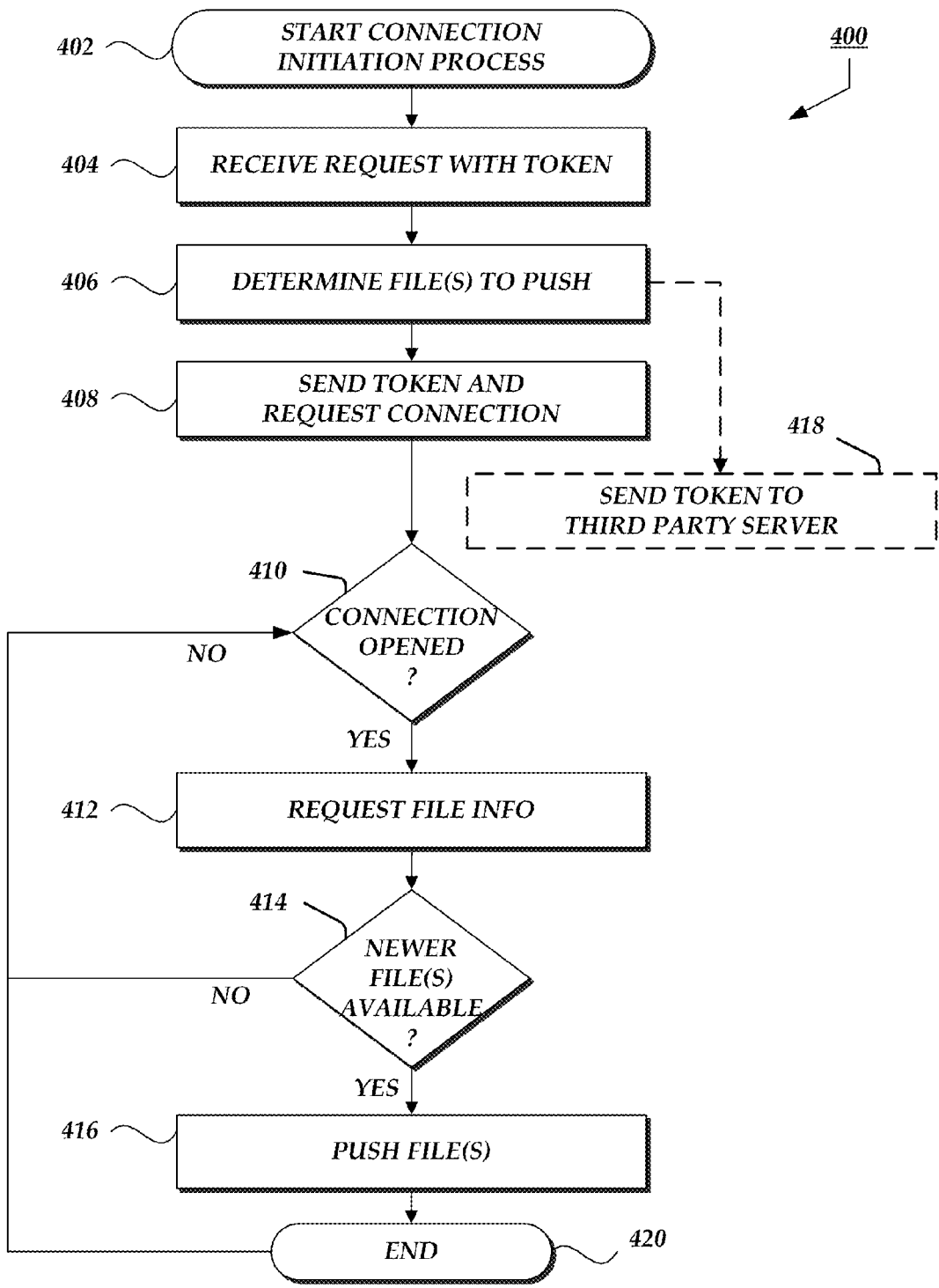
FIG. 4 is a flow diagram of an illustrative process for server initiation of a connection using a token.

Turning now to FIG. 4, an illustrative process 400 for enabling server-initiated connections to a client device 104 will be described. The process 400 may be executed by a connection initiation module 122, 162 or some other module or component of the content server 102 or third party server 106. The content server 102 may receive a request, from a client device 104, for content hosted by the content server 102, such as content in the content data store 126. In addition to responding to the request, the content server 102 may discover that a token has been received in a HTTP header or via some other method. The content server 102 may also determine that the client device 104 accepts incoming connections, for example by detecting which browser the client device 104 is using as indicated in the User-Agent HTTP header. Upon determining that opening an additional connection is desirable, the connection initiation module 122 may transmit a request to the client device 104 to open a connection. Advantageously, once a connection is opened in this manner the content server 102 may initiate transfer of content files and other data to the client device 104 without requiring a request from the client device 104 to do so.

The process 400 begins at block 402. The process 400 may be embodied in a set of executable program instructions and stored on a computer-readable medium drive of a content server 102 or some other computing system with which the content server 102 is associated. When the process 400 is initiated, the executable program instructions can be loaded into memory, such as RAM, and executed by one or more processors of the computing system. In some embodiments, the computing system may include multiple computing devices, such as servers, and the process 400 may be executed by multiple servers, serially or in parallel.

At block 404, the content server 102 may receive a request, with a token, from a client device 104. In addition to responding to the request, the content server 102 may determine that opening another connection with the client device 104 is desirable.

The content server 102 may then, at block 406, determine which files or other data to send to the client device 104 in the event that the client device 104 accepts the request to open a connection. For example, if the client device 104 has requested a content page, such as a web page defined by an HTML file, the content server 102 may prioritize the various files corresponding to embedded references within the HTML file. The files may be prioritized by size, type, relative importance (e.g.: images files to be displayed near top may be more important than image files at the bottom), some combination thereof, or any number of other factors.

The content server 102 may determine that one or more files to be transmitted to the client device 104 are hosted by or otherwise associated with a third party server 106. In some embodiments, the content server 102 may further determine that the benefits of establishing additional connections support a decision to pass the token or some data derived from the token to the third party server 106 at block 418. The content server 102 can instruct or request that the third party server 106 to establish a connection with the client device 104 and transmit the files that the content server 102 has determined will be required.

At block 408, the content server 102 may send a request for a new connection to the client device 104, and include the token received at block 404. At decision block 410, if the content server 102 receives a denial, from the client device 104, to open the connection, the process 400 may terminate at block 420. If the client device 104 accepts the request and establishes the connection, the content server 102 may begin the process of transmitting files to the client device 104.

In some embodiments, the content server 102 may be configured to determine whether the client device 104 has a copy of a file prior to transmitting the file over the newly established connection. For example, client devices 104 commonly implement local caches in which copies of previously received content are stored. Future requests for the cached content may be served out of the cache, thereby saving the time and resources associated with retrieving the content from a content server 102. The client device 104 may initiate a brief communication with the content server 102 to determine whether the cached content is up-to-date by transmitting an If-Modified-Since HTTP request. A content server 102 responds to the If-Modified-Since request with a brief message if the content has not been modified in the time since the client device 104 cached the copy. If the content has been modified, the content server 102 may simply respond to the If-Modified-Since request with the current version of the content.

In the server-initiated connection process 400 of the present example, the content server 102 may instead initiate a brief communication with the client device 104 which is effectively the reverse of the If-Modified-Since HTTP request. For example, the content server 102 may request information from a client device 104 regarding a file that may or may not be stored in the cache of the client device 104 at block 412, and analyze any response received from the client device 104. The requested information may include a time stamp from when the content was cached, and a checksum or hash of the content to further determine whether the content has changed. The content server 102 may then compare the timestamps, or compute a hash or checksum to compare against the received data.

In some embodiments, the content server 102 may instead send the client device 104 a timestamp from the time of the last update to the content, and a checksum or hash of the most recent version. The client device 104 may then use the information to determine whether the content has changed, and transmit a request for the updated version to the content server 102.

At decision block 414, the content server 102 may determine whether there is a newer version of a file available. The determination may be based on a comparison of data received from the client device 104 to data regarding the current version, as described above with respect to block 412. If a file has been updated, the process 400 may proceed to block 416, where the current version of the file is transmitted to the client device 104. Otherwise, the process 400 may terminate at 420.

In some cases, the content server 102 may determine at block 406 that multiple files are to be transmitted. In such chases, the content server 102 may execute portions of the process 400, optionally including blocks 412 and 414, for each file to be transmitted, or only once for all files at substantially the same time.

Figure 5:
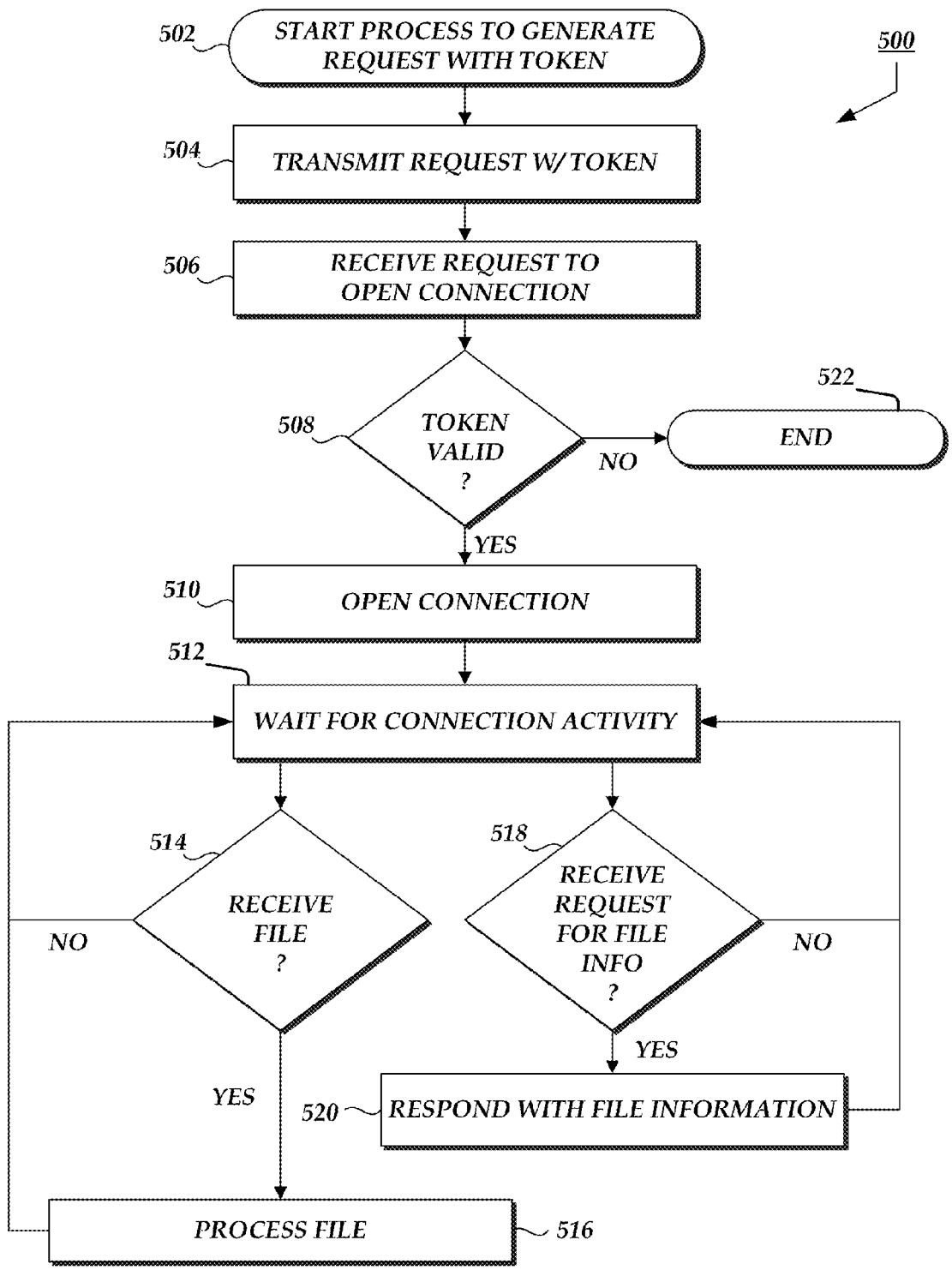
FIG. 5 is a flow diagram of an illustrative process for transmitting a token to a server and receiving a request, from the server, to open a connection.

Turning now to FIG. 5, an illustrative process 500 for receiving requests for and establishing server-initiated connections on client device 104 will be described. The process 500 may be executed by the browser 140 of the client device 104, and specific portions may be implemented by the token control module 142. The token control module 142 can generate tokens for transmission to the content server 102, keep a record of all transmitted tokens, and validate tokens received from the content server 102 or third party server 106 against those records. Advantageously, when a token is received, the token control module 142 can determine not only the authenticity of the token, but also whether the token has expired in order to prevent unauthorized use of the token.

The process 500 begins at block 502. The process 500 may begin automatically, such as in response to initiation, by a user of the client device 104, of a request for a content object from a content server 102. The process 500 may be embodied in a set of executable program instructions and stored on a computer-readable medium drive of the client device 104. When the process 500 is initiated, the executable program instructions can be loaded into memory, such as RAM, and executed by one or more processors of the client device 104.

At block 504, the client device 104 may transmit a request for a content page or other network accessible file, and include a token in the request as described above. Data regarding the token may be recorded by the token control module 142 in order to determine later, when the token is received with a request to open a connection, which entity the token was transmitted to, at what time the transmission was made, and the like. Alternatively or in addition, such data may be embedded within the token.

The time at which the token was originally transmitted may be used to determine whether the token has expired. For example, a client device 104 may not accept tokens that are more than 1 hour old, 1 minute old, or 1 second old. This may be for security reasons (e.g.: to reduce the window of time in which the token may be intercepted and used by a malicious third party). Additionally, in some implementations the client device 104 may wish to limit the content server 102 to using the token for transmitting files associated with the request with which the token was originally sent to the content server 102, rather than at a later time or at the discretion of the content server 102.

At block 504, the client device 104 may receive a request, from a content server 102 or a third party server 106, to open a connection. At decision block 506, the token control module 142 may determine whether the token is valid. If the token is not valid, the process may terminate at block 522. In some embodiments, the client device 104 may transmit a notification to the requesting entity if the token is expired or otherwise invalid. If the token control module 142 determines that the token is valid and has not expired, the process may proceed to open the connection at block 510 and wait for activity over the connection at block 512.

Various network activities may occur over a network connection initiated by a content server 102 (or third party server 106), including many or all of the actions, requests, responses, and transmissions that occur over a connection initiated by a client device 104. For example, the client device 104 may receive a file from the content server 102 at decision block 514. If a file is received, the client device 104 may process the file at block 516. Processing the file can include storing the file in a cache so that when an embedded reference to the file is encountered, the file may be retrieved from cache without a request to the content server 102. In some embodiments, processing may include displaying a file for pre-rendering a file for later display. The process may then return to block 512.

The client device 104 may also receive a request, over the server-initiated connection, for information regarding a file that may or may not be present on the client device 104. As described above with respect to FIG. 4, the content server 102 may request information about a particular file prior to sending the file in order to avoid consuming bandwidth and other resources by sending a duplicate file. The request may include, for example, information about the current version of the file as hosted by the content server 102, and the client device 104 may then determine whether the local version is the current version. Alternatively, the request may cause the client device 104 to provide information about the local version to the content server 102. At block 520, the client device 104 can provide the requested information. The process may then return to block 512.

The client device 104 may wait for connection activity at block 512 for a predetermined amount of time, until the connection is closed by the content server 102, until a user of the client device 104 causes the browser 140 to navigate to a different domain, or until the occurrence or nonoccurrence of some other event.

Generation and Usage of Hints

Figure 6:
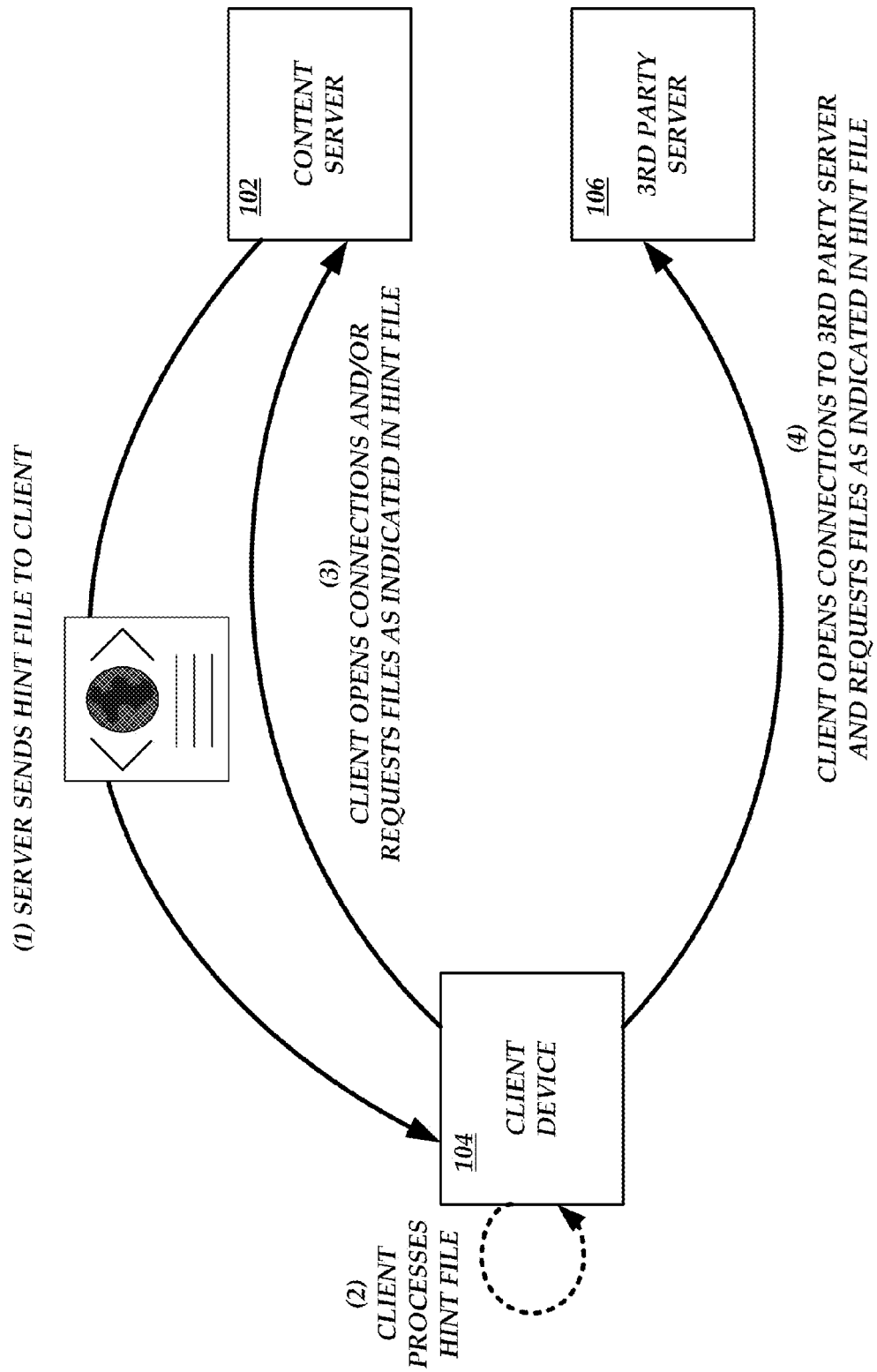
FIG. 6 is a block diagram of illustrative communications and data flows between a client device, a content server, and a third party server.
Figure 7:
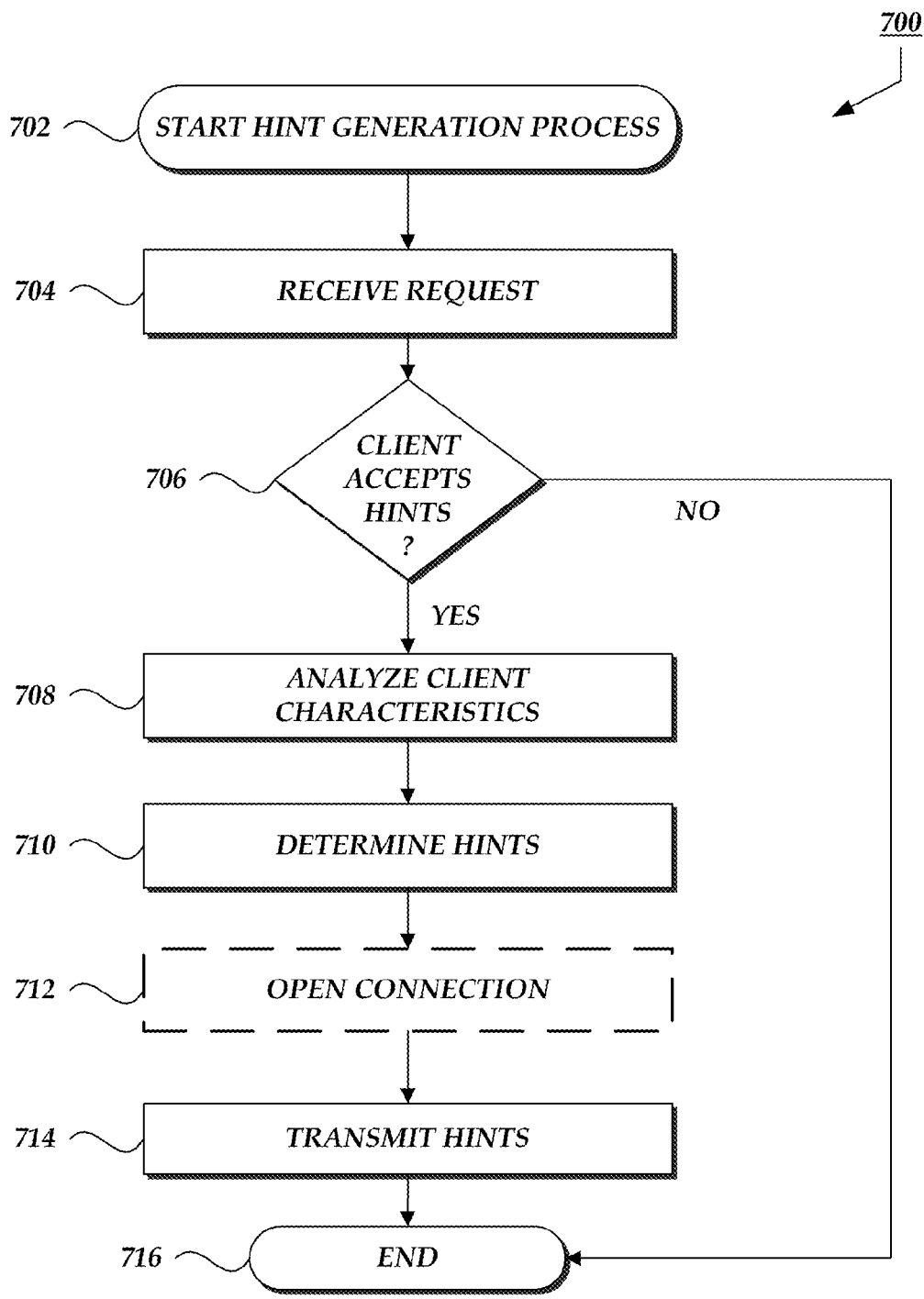
FIG. 7 is a flow diagram of an illustrative process for generation and transmission of hints to a client device.
Figure 8:
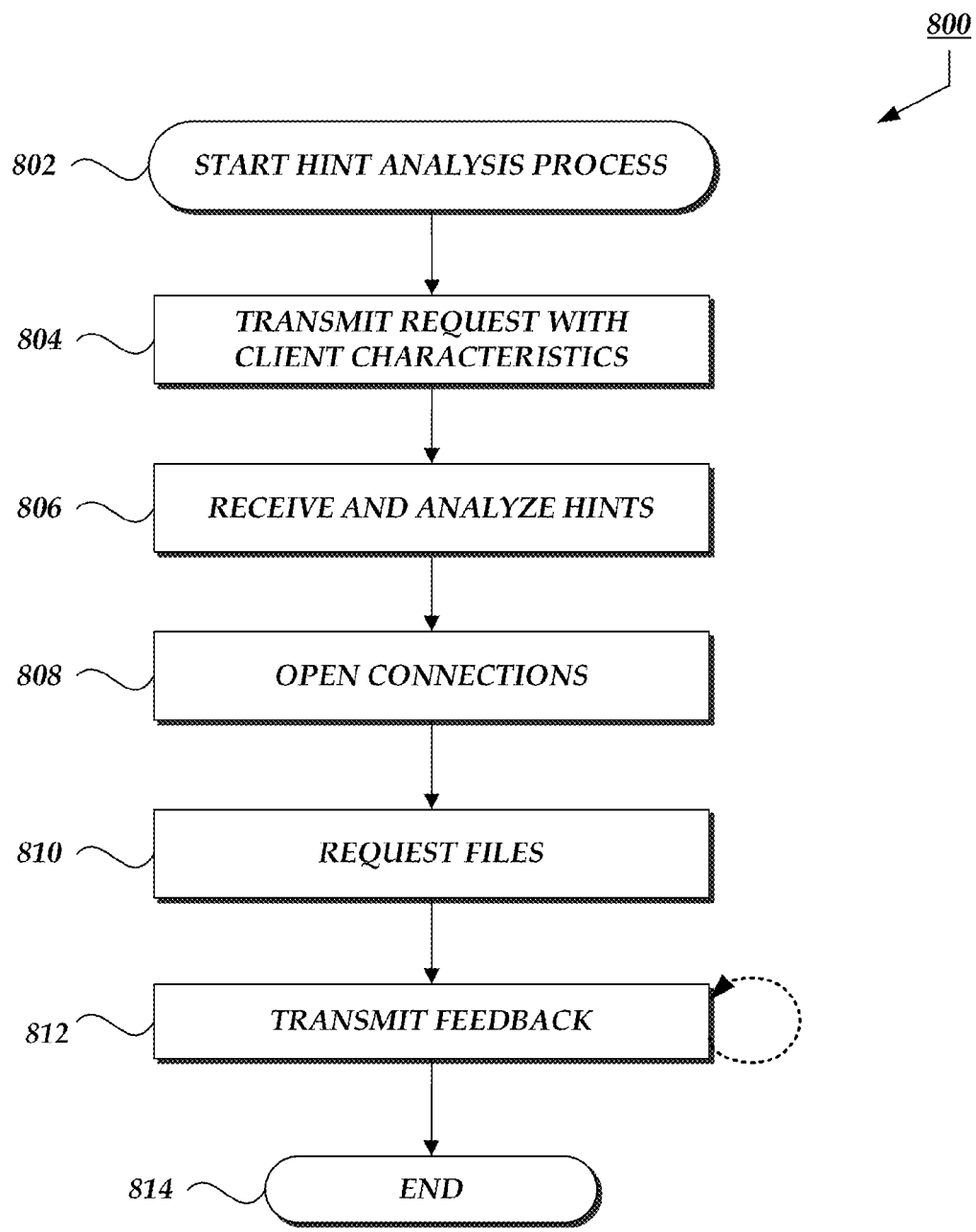
FIG. 8 is a flow diagram of an illustrative process for receipt and process of a hint file from a content server.

FIGS. 6-8 illustrate data flows and processes for implementing various features related to the creation and usage of hints and hint files. As described above, a content server 102 is in a position to know which files are necessary to response to content requests, because the content server 102 hosts the content and has a greater knowledge of its structure and dependencies than a client device 104 may have about the content. Hints may be created by content servers 102 in order to provide client devices 104 with additional information about how to efficiently retrieve and process content associated with the content server 102. For example, a content server 102 may provide a prioritized list of files to fetch before the client device 104 knows that it will need the files. In another example, the hint file may include a list of domains and an indication that the client device 104 should resolve the domains or open a number of connections to the domains so that the connections are ready when the client device 104 needs to access a file from one of the domains. In a further example, the hint file may include pre-resolved DNS addresses for use by the client device 104 in opening connections and requesting content and other data.

With reference to FIG. 6, a content server 102 may transmit a hint file to a client device 104 at (1). The transmission may occur over a connection established at the request of the content server 102, as described in detail above. In some cases, the hint file may be transmitted over a single connection established at the request of the client device 104, such as the connection over which the client device 104 transmitted a content request to the content server 102. For example, if the client device 104 initiated a connection with the content server 102 via the SPDY protocol, the content server 102 may initiate a transfer of data to the client device 104 over that same connection even though it was established by the client device 104.

In some embodiments, the content server 102 may determine that a client device 104 is configured to receive and process hint files based on data received from the client device 104, such as HTTP headers transmitted with an HTTP request. If the content server 102 inspects the User-Agent HTTP header and determines that the browser 140 of the client device 104 is capable of processing and using hints, then the content server 102 may begin inserting hints into custom HTTP response headers, similar to the insertion of a token into a custom HTTP request header described above. For example, a custom Open-Connections HTTP header may be included and assigned a value indicating the IP address, URLs, or other identifiers of various hosts with which the client device 104 should open connections. A custom Retrieve-Files HTTP header may be assigned a vale indicating specific files to retrieve. Any number of other custom HTTP headers may be implemented. In further embodiments, the content server 102 may embed a reference at the top of a requested file, such as an HTML file, to retrieve the hint file from the content server 102. In such cases, the browser 140 of the client device can request and process an HTML file using standard methods, and request the hint file as it encounters the reference.

The hint analysis module 144 or some other component of the browser 140 or client device 104 may process the received hints at (2). Processing the hints may include determining which domains to resolve, how many connections to open, which order to retrieve files that will be needed, and the like. The client device 104 can then act on the hints at (3), such as by opening a connection with the content server 102 and requesting a file based on the received hint, not on the received HTML file. The client device 104 may also open connections to third party servers 106 at (4) according to a listing or other instructions in the hint file.

Turning now to FIG. 7, an illustrative process 700 for generating hints at a content server 102 will be described. The process 700 may be executed by the hint generator 124 of the content server 102. Advantageously, the hint generator 124 may be configured to prepare a list of connections to open, prioritized list of resources to retrieve, alternate files to retrieve, and other actions to take in order to improve the performance and user experience at a client device 104 with respect to the content hosted by the content server 102.

The process 700 begins at block 702. The process 700 may begin automatically, such as when a content server 102 is initialized, or in response to some user or administrator event. The process 700 may be embodied in a set of executable program instructions and stored on a computer-readable medium drive of the computing system with which the content server 102 is associated. When the process 700 is initiated, the executable program instructions can be loaded into memory, such as RAM, and executed by one or more processors of the computing system. In some embodiments, the computing system may include multiple computing devices, such as servers, and the process 700 may be executed by multiple servers, serially or in parallel.

At block 704, the content server 102 receives a request from a client device 104. The request may be an HTTP GET request or some other request for a content item. At decision block 706, the content server 102 can determine whether the client device 104 is configured to accept hints. As described above, the content server may inspect the User-Agent HTTP header to identify the browser 140 type and version. If the browser 140 is configured to accept hints, such as the browser 140 with a hint analysis module 144 illustrated in FIG. 1, the process 700 can proceed to block 708; otherwise the process 700 can terminate at block 716.

At block 708, the content server 102 may analyze any client characteristics that have been transmitted to the content server 102 or which the content server 102 otherwise has access to. For example, the client device 104 may be configured to transmit data to the content server 102 about the current network connection of the client device 104 (e.g.: bandwidth, latency), the display available on the client device 104 (e.g.: resolution, physical size), the computing capacity of the client device 104 (e.g.: processor type, memory), and other characteristics which may affect performance. The data may be included in custom HTTP headers, communicated with the content server 102 before or after the transmission of an HTTP request, detected from other data commonly transmitted (e.g.: IP address), detected by the content server 102 or some other system over a series of requests from the client device 104, etc. In some embodiments, the content server 102 may have access to a data store with profile data about a client device 104.

The analysis of client characteristics can affect which hints to generate and send to the client device 104. At block 710, the content server 102 can generate hints for transmission to the client device 104.

At block 712, the content server 102 can optionally establish a connection with the client device 104, as described in detail above. The content server 102 may then use the connection to transmit a file containing the hints, or a stream of hint data, to the client device 104 at block 714. Alternatively, the content server 102 may transmit the hints to the client device 104 without establishing a new connection. For example, if the content server 102 and the client device 104 have an existing SPDY connection open, the content server 102 may initiate transmission transmit hint files and data to the client device 102 over the connection. In some embodiments, the content server 102 may induce the client device 104 to request the hint file, as described above, by embedding a reference to the hint file in a file that the client device 104 has or will request. The content server 102 may also include hints in custom HTTP response headers sent to the client device 102. The hints may be associated with an expiration, such as an HTTP header indicating a lifetime or expiration date or time. Data regarding the hints may be stored by a client device 104 until they are expired, similar to the caching of other network-accessible content.

Turning now to FIG. 8, an illustrative process 800 for receiving and acting upon hints at a client device 104 will be described. The process 800 may be executed by the browser 140 of the client device 104, and specific portions may be implemented by the hint analysis module 144. Advantageously, when a hint is received, the hint analysis module can initiate actions according to the hints, such as establishing connections and retrieving resources that the browser 140 may need in the future, thereby improving performance and the user experience.

The process 800 begins at block 802. The process 800 may begin automatically, such as in response to initiation, by a user of the client device 104, of a request for a content object from a content server 102. The process 800 may be embodied in a set of executable program instructions and stored on a computer-readable medium drive of the client device 104. When the process 800 is initiated, the executable program instructions can be loaded into memory, such as RAM, and executed by one or more processors of the client device 104.

At block 804, the browser 140 may transmit a request for content to a content server 102. The request may include information about the current operating environment of the browser 140, such as network conditions, available computing resources, and the like. Such information may be included in custom HTTP headers, transmitted via an application programming interface (API) exposed by the content server 102, or through some other method. In some embodiments, the browser 140 or some other component of the client device 104 may be configured to store previously received hints, similar to caching content items. In such cases, the browser 140 can determine whether a hint file or other hint data associated with the requested content or content source has been previously received. If so, the hints may be processed and acted upon, as described below.

At block 806, the browser 140 may receive one or more hints from the content server 102. The hint analysis module 144 may analyze the hints to determine which actions, if any, to take based upon the hints. As described above, the hints may include a prioritized list of resources associated with the originally requested content such that the browser 140 may initiate retrieval of the resources prior to determining that they are needed for full processing or rendering of the originally requested content. Other hints may include alternative resources to retrieve, connections to proactively open, etc.

At block 808, the browser 140 may open various connections according to the hints. The connections may be opened to request specific resources, as specified in the hints. In some embodiments, connections may be opened in anticipation of requesting content in the future. For example, a particular content item may include embedded references to a number of dynamically determined objects hosted by third party servers 106, such as CDN servers. The hint file may indicate that the browser 140 should proactively establish connections to the CDN servers so that once the dynamically determined objects are identified, the browser 140 may quickly retrieve the objects without waiting to establish a connection.

At block 810, the browser 140 may retrieve files and other resources as indicated in the hint file. Files may be retrieved in a prioritized order, in parallel, etc. For example, the browser 140 may be downloading the originally requested HTML file. That download may only be consuming 60% of the bandwidth available to the browser 140. The browser 140 may proceed to utilize the remaining 40% of available bandwidth to download other resources associated with the requested content, according the hint file. The associated resources may be retrieved before the browser 140 finishes downloading the HTML file and is able to otherwise determine that the additional resources are to be retrieved. The hint file may also identify one or more substitute resources to retrieve based on the characteristic data sent to the content server 102 at block 804. For example, the substitute resources may be low resolution images or videos for mobile browsers (e.g.: browsers operating on a mobile phone).

At block 812, the browser 140 may transmit feedback to the content server 102. The feedback may be similar to the characteristic data that was transmitted with the original request. However, feedback data may inform the content server 102 about operating conditions with respect to the content from the content server 102, rather than before the content from the content server 102 is received.

All of the client-side functionality described in this specification may be embodied in executable code of a browser program that supports HTTP, HTML, and other World Wide Web protocols and standards. For example, the disclosed features may be incorporated into a mobile device browser 140 that runs on a tablet or mobile phone that retrieves content over a wireless data network. In such mobile-device embodiments in which wireless bandwidth limitations can be significant, the ability for content servers 102 to push content and/or send hints to the mobile device 104 can significantly improve user-perceived performance. As described above, additional performance benefits can be achieved by designing the mobile browser 140 to notify servers of the mobile device's attributes (e.g., relatively small form factor, touch screen, etc.), and by designing the associated content server components 122, 124 to consider these attributes in selecting content and/or hints to send to the mobile device 104. The browser may, in some embodiments, be configurable by the user to enable and disable server-initiated connections and/or prefetching based on server-supplied hints.

Terminology

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The steps of a method, process, routine, or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor such that the processor can read information from, and write information to, the storage medium. In the alternative, the storage medium can be integral to the processor. The processor and the storage medium can reside in an ASIC. The ASIC can reside in a user terminal. In the alternative, the processor and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Conjunctive language such as the phrase "at least one of X, Y and Z," unless specifically stated otherwise, is to be understood with the context as used in general to convey that an item, term, etc. may be either X, Y, or Z, or a combination thereof. Thus, such conjunctive language is not generally intended to imply that certain embodiments require at least one of X, at least one of Y and at least one of Z to each be present.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments of the inventions described herein can be embodied within a form that does not provide all of the features and benefits set forth herein, as some features can be used or practiced separately from others. The scope of certain inventions disclosed herein is indicated by the appended claims rather than by the foregoing description. All changes which come within the meaning and range of equivalency of the claims are to be embraced within their scope.

What is claimed is:

1. A system for delivering content over a network, the system comprising:
    a content server that hosts a content page, the content server comprising a processor and a memory; and
    a module comprising executable instructions stored in the memory, wherein the content server is programmed, via the module, to receive, from a client device via a first network connection between the content server and the client device, a request for the content page, the request comprising an authentication token, wherein the content page includes a file having a reference to an embedded resource, said content server additionally programmed via the module to respond to the request for the content page by at least:
        transmitting the file to the client device over the first network connection;
        identifying the embedded resource;
        generating, and transmitting to the client device, a request to establish a second network connection between the content server and the client device, the request to establish the second network connection comprising the authentication token or data derived from the authentication token; and
    in response to establishment of the second network connection, transmitting the embedded resource to the client device via the second network connection;
    said module thereby enabling the content server to proactively deliver the embedded resource to the client device without receiving a request from the client device for the embedded resource.

2. The system of claim 1, wherein the second network connection comprises a Hypertext Transfer Protocol (HTTP) connection.

3. The system of claim 1, wherein the embedded resource is identified based at least in part on the first request.

4. The system of claim 1, wherein the one or more processors are further configured to:
    identify a second embedded resource of the content page, the second embedded resource hosted by a third party server; and
    transmit the authentication token to the third party server.

5. The system of claim 1, wherein the one or more processors are further configured to:
    identify a second embedded resource of the content page;
    determine a preferred sequence in which to transmit the embedded resource and the second embedded resource; and
    further in response to the establishment of the second network connection, transmit the second embedded resource to the client device via the second network connection, wherein the embedded resource and the second embedded resource are transmitted sequentially according to the preferred sequence.

6. The system of claim 5, wherein the preferred sequence is determined based at least in part on a characteristic of each of the embedded resource and second embedded resource.

7. The system of claim 6, wherein the characteristic comprises one of file size or display position.

8. The system of claim 1, wherein the request comprises a Hypertext Transfer Protocol (HTTP) request, and wherein the authentication token is received in an HTTP header.

9. A computer-implemented method for delivering content over a network, the computer-implemented method comprising:
    by a content server comprising a processor and memory:
    receiving, from a client device via a first network connection between the client device and the content server, a request for a first content item hosted by the content server, the request comprising an authentication token, wherein the first content item comprises a file containing a reference to a second content item that is an embedded resource of the first content item;
    transmitting the file to the client device over the first network connection in response to the request;
    identifying the second content item based at least in part on the request, wherein the second content item is different than the first content item;
    establishing a second network connection with the client device, wherein establishing the second network connection comprises transmitting, from the content server to the client device, a request to establish the second network connection between the content server and the client device, the request to establish the second network connection comprising data associated with the authentication token; and
    in response to establishment of the second network connection between the content server and the client device, transmitting the second content item to the client device via the second network connection, said transmitting not being responsive to a request from the client device for the second content item.

10. The computer-implemented method of claim 9, further comprising, by the content server:
    identifying a third content item based at least in part on the request for the first content item, the third content item hosted by a third party server; and transmitting data associated with the authentication token to the third party server.

11. The computer-implemented method of claim 9, further comprising:
   requesting, from the client device, version data regarding a copy of the second content item stored on the client device;
   receiving the version data; and
   determining, based at least in part on the version data, whether to transmit the second content item to the client device.

12. The computer-implemented method of claim 9, wherein the data associated with the authentication token comprises a digital signature of the content server, the digital signature comprising encrypted data associated with the authentication token.

13. The computer-implemented method of claim 9, further comprising, by the content server:
   identifying a third content item, wherein the third content item is different than both the first content item and the second content item;
   determining a preferred sequence in which to transmit the second content item and the third content item; and
   further in response to the establishment of the second network connection, transmitting the third content item to the client device via the second network connection, wherein the second content item and the third content item are transmitted sequentially according to the preferred sequence.

14. The computer-implemented method of claim 9, wherein the second content item is an embedded resource of the first content item.

15. The computer-implemented method of claim 9, further comprising, by the content server:
   identifying a third content item, wherein the third content item is different than both the first content item and the second content item; and
   transmitting, to the client device, a request to establish a third network connection, the request comprising data associated with the authentication token.

16. The computer-implemented method of claim 9, wherein the request comprises a Hypertext Transfer Protocol (HTTP) request, and wherein the authentication token is received in an HTTP header.

17. The computer-implemented method of claim 9, wherein the first content item comprises a Hypertext Markup Language (HTML) file, and wherein a reference to the second content item is embedded within the HTML file.

18. A non-transitory computer storage medium which stores a browser component comprising executable code that is executed on a client computing device to perform a process comprising:
   transmitting, via a first network connection between the client computing device and a content server, a first request for a first content item hosted by the content server, the first request comprising an authentication token;
   receiving the first content item from the content server over the first network connection;
   processing a second request to establish a second network connection with the content server, said second request received from the content server, the second request comprising authentication data;
   determining whether to establish the second network connection with the content server based at least in part on whether the authentication data corresponds to the authentication token; and
   receiving, from the content server, a second content item via the second network connection between the client computing device and the content server, said second content item being an item not requested by the client computing device, wherein the second content item is an embedded resource of the first content item.

19. The non-transitory computer storage medium of claim 18, wherein the authentication data comprises the token.

20. The non-transitory computer storage medium of claim 18, wherein the process further comprises:
   receiving, from a third party server, a third request to establish a third connection between the third party server and the client computing device, the third request comprising the authentication token or data derived from the authentication token;
   determining whether to establish the third network connection based at least in part on the authentication token or data derived from the authentication token; and
   in response to determining to establish the third network connection, receiving a third content item from the third party server via the third network connection, said third content item being an item not requested by the client computing device.

21. The non-transitory computer storage medium of claim 18, wherein the process further comprises receiving, from the content server, a third content item via the second network connection.

22. The non-transitory computer storage medium of claim 18, wherein the process further comprises:
   receiving, from the content server, a third request for version information regarding a copy of the second content item stored locally; and
   transmitting the version information to the content server.

23. The non-transitory computer storage medium of claim 18, wherein the process further comprises generating the authentication token, wherein the authentication token is based at least in part on identity data associated with the content server.

24. The non-transitory computer storage medium of claim 18, wherein the process further comprises generating the authentication token, wherein the authentication token is associated with an expiration date.

25. The non-transitory computer storage medium of claim 18, wherein the process further comprises generating the authentication token, wherein the authentication token comprises encrypted data.

26. The non-transitory computer storage medium of claim 18, wherein the authentication data comprises data associated with the authentication token.

27. The non-transitory computer storage medium of claim 18, wherein the first request comprises a Hypertext Transfer Protocol (HTTP) request, and wherein the authentication token is transmitted in an HTTP header.

28. The non-transitory computer storage medium of claim 18 wherein the client computing device comprises a mobile device, and wherein the browser component comprises a mobile browser component.

* * * * *